United States Patent [19]

Chang et al.

[11] Patent Number: 5,064,912

[45] Date of Patent: Nov. 12, 1991

[54] PROCESS FOR OXIDIZING POLYMERS DERIVED FROM UNSATURATED KETONES

[75] Inventors: Biau-Hung Chang, West Chester; Jack Kwiatek, Cincinnati, both of Ohio

[73] Assignee: Quantum Chemical Corporation, New York, N.Y.

[21] Appl. No.: 624,363

[22] Filed: Dec. 6, 1990

[51] Int. Cl.$^5$ .................................................. C08F 8/06
[52] U.S. Cl. .................................. 525/383; 525/328.6; 525/386; 525/387
[58] Field of Search .................... 525/383, 386, 387

[56] References Cited

U.S. PATENT DOCUMENTS 4,929,711  5/1990  Chang et al. ..................... 528/220
4,957,997  9/1990  Chang et al. ..................... 518/220

Primary Examiner—Bernard Lipman
Attorney, Agent, or Firm—Kenneth D. Tremain; Gerald A. Baracka

[57] ABSTRACT

A process for converting the pendant keto groups of ketonic polymers to ester groups is provided. The process involves reacting the polymer with an organic peroxyacid oxodizing agent in an inert liquid medium at a temperature from −20° C. to 150° C. to convert substantially all or only a portion of the pendant carbonyl functionality to oxycarbonyl moieties. Homopolymers or copolymers of α, β-unsaturated ketones, such as methyl vinyl ketone and ethyl vinyl ketone, are readily modified with the process of this invention.

12 Claims, No Drawings

5,064,912

PROCESS FOR OXIDIZING POLYMERS DERIVED FROM UNSATURATED KETONES

BACKGROUND OF THE DISCLOSURE

1. Field of the Invention

The present invention relates to a process for oxidizing keto groups pendant to a polymer chain to oxycarbonyl moieties. More particularly, the invention involves a process whereby pendant keto groups present in polymers obtained by polymerizing $\alpha,\beta$-unsaturated ketones are oxidatively converted to oxycarbonyl groups.

2. Description of the Prior Art

The ability to chemically introduce sensitizing groups, such as ketonic moieties which absorb radiation in the region produced by natural sunlight, to impart some degree of photodegradability to polymer systems is known. This is accomplished by copolymerizing a monomer containing the sensitizing group with one or more other monomers. The sensitizing groups provide sites within the polymer molecule which are susceptible to attack and where the polymer chain will be broken. Breaking the polymer chain reduces the molecular weight and forms smaller segments which facilitates further degradation in that the polymer surface area is increased and more and different chain ends are produced. When the polymer chain is broken in enough places, it then also becomes susceptible to degradation by biological mechanisms—ultimately to $CO_2$ and water. The incorporation of sensitizing groups to develop photodegradable plastics and commercial plastic materials produced using this approach are discussed by J. Guillet in *Proceedings of Symposium on Degradable Plastics*, The Society of the Plastics Industry, Inc., Washington, D.C., June 10, 1987.

Homopolymers and copolymers which contain sensitizing groups obtained by the polymerization of $\alpha,\beta$-unsaturated ketones and generically referred to as vinyl ketone polymers are known. A general review of vinyl ketone polymers and the various methods employed for their polymerization is provided in *Encyclopedia of Polymer Science and Technology*, Vol. 14, 617–636, Interscience, a division of John Wiley & Sons, New York, (1971).

While numerous carbonyl group-containing monomers have been homopolymerized, poly(methyl vinyl ketone) and poly (isopropenyl methyl ketone) are the most widely known vinyl ketone homopolymers. Copolymers of $\alpha,\beta$-unsaturated ketones with most of the common vinyl and diene monomers are also known. For example, numerous references cite copolymers of methyl vinyl ketone or isopropenyl methyl ketone with ethylene, styrene, butadiene, butyl acrylate and vinylidene chloride. Photodegradable polymers obtained by copolymerizing vinyl ketones with various comonomers and uses of such polymers are disclosed in U.S. Pat. Nos. 3,753,952, 3,811,931, 3,853,814, 3,860,538 and 3,878,169. Terpolymers prepared from the following monomers are also known: methyl vinyl ketone, styrene and acrylonitrile; methyl vinyl ketone, styrene and methyl methacrylate; methyl vinyl ketone, styrene and acrylic acid; and methyl vinyl ketone, methacrylonitrile and vinyltoluene.

Polymers containing keto groups in the polymer chain and terminal ester groups have been produced by the palladium(II) catalyzed copolymerization of carbon monoxide with ethylene in alcoholic solvents as disclosed by T. Lai, et al in *Organometallics*, 3, 866–870(1984). The amount of ester functionality is obviously limited using this approach.

It is also possible in copolymerizations of keto-containing monomers to include one or more comonomers containing ester functionality, such as vinyl acetate and alkyl acrylates or methacrylates. Due to the different reactivities of the various monomers, however, problems can be encountered using this approach.

It would be advantageous if ester groups could be introduced into vinyl ketone polymers without the need to include ester-containing monomers in the polymerization, such as by post-polymerization modification of the polymer.

U.S. Pat. Nos. 4,929,711 and 4,957,997 disclose an oxidation process for converting polyketones, i.e., polymers having carbonyl groups within the polymer backbone, to polyesters. Organic peroxyacid oxidizing agents are used for these processes. Pending application Ser. No. 498,527 discloses poly(keto-esters) produced by the foregoing processes comprised of carbonyl units, oxycarbonyl units and linking units derived from olefinic monomers.

SUMMARY OF THE INVENTION

The present invention relates to a process whereby the ketone groups of a vinyl ketone polymer are converted to ester moieties. More specifically, the process involves an oxidative procedure whereby substantially all or only a portion of the carbonyl groups pendant to the polymer backbone are converted to oxycarbonyl groups. The oxidative conversion is accomplished without significant chain scission so that the molecular weight and molecular weight distribution of the polymer are not substantially altered.

The process involves contacting a polymer obtained by the polymerization of an $\alpha,\beta$-unsaturated ketone and having a molecular weight greater than 1,000 and from 0.01 to 25 mole percent carbonyl (number of carbonyl groups per total number of carbon atoms times 100) with an organic peroxyacid oxidizing agent having from 1 to 20 carbon atoms in an inert liquid medium at a temperature from $-20°$ C. to $150°$ C. The molar ratio of organic peroxyacid to carbonyl can range from 0.1:1 to 30:1 and the weight ratio of the inert liquid medium to polymer can range from 1:1 to 100:1. Substantially all or only a portion of the carbonyl functionality can be converted to ester moieties.

In a particularly useful embodiment of the invention, the ketonic polymer will have a molecular weight from about 10,000 to about 1,000,000 and the carbonyl content will range from 0.5 to 20 mole percent. Organic peroxyacids which are especially useful oxidizing agents include chloro-, fluoro-, and carboxyl-substituted aromatic or aliphatic peroxyacids. These peroxyacids are particularly effective for the process when employed at molar ratios from 2:1 to 15:1 (peroxyacid:carbonyl). The process is particularly useful for oxidizing the keto groups in vinyl ketone copolymers obtained by the polymerization of methyl vinyl ketone or ethyl vinyl ketone with ethylene or styrene.

DETAILED DESCRIPTION OF THE INVENTION

The present invention broadly relates to a process for converting pendant ketone groups in polymers produced by the polymerization of $\alpha,\beta$-unsaturated ketone monomers to ester groups. The ketone groups, also referred to herein as carbonyl or keto groups, may be randomly or uniformly substituted along the polymer chain. All or only a portion of the pendant carbonyl groups may be converted to ester moieties, also referred to herein as oxycarbonyl groups. In the case where less than all of the available carbonyl groups are oxidized, the resulting polymers will have both oxycarbonyl and carbonyl groups pendant to the polymer chain.

It will be apparent to those skilled in the art that a wide range of useful polymer products with varying amounts of ketone and ester functionality can be produced by the process. It is a highly desirable feature of the process that it is possible to vary the composition of the resulting polymers with respect to the amount of carbonyl and oxycarbonyl groups. The ability to vary the carbonyl to oxycarbonyl ratio makes it possible to "tailor" products for specific applications and to meet to predetermined specifications.

Considering the reaction of only a single pendant carbonyl group of a vinyl ketone polymer the reaction can be represented as follows:

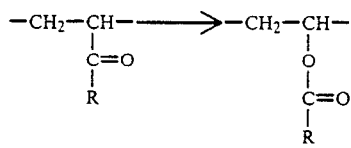

where R represents an alkyl group having 1 to 8 carbon atoms, phenyl or an alkyl-substituted phenyl radical containing from 7 to 12 carbon atoms. It is also possible for oxygen insertion to occur between the carbonyl group and the alkyl group. This reaction, would be represented as follows:

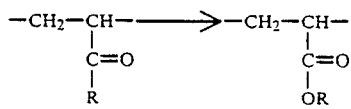

While essentially quantitative conversion of carbonyl to oxycarbonyl can be obtained, it is not necessary. A substantial amount of the pendant carbonyl functionality can remain unreacted and be present in the resulting polymer product.

Polymers utilized for the process of the present invention have a hydrocarbon polymer chain backbone with a plurality of ketonic moieties substituted along the polymer chain. The polymer chain is comprised substantially entirely of carbon atoms and the carbonyl groups may be directly linked to the polymer backbone or linked through a bivalent radical, such as an alkylene radical. The ketonic polymers will contain structural units corresponding to the formula

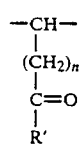

where n is an integer from 0 to 4 and R' represents an alkyl group having from 1 to 8 carbon atoms, phenyl or an alkyl-substituted phenyl radical containing from 7 to 12 carbon atoms.

Homopolymers and copolymers of α,⊕-unsaturated ketones, particularly alkyl vinyl ketones, are especially well adapted for modification by the process of the present invention. Alkyl vinyl ketone polymers contain repeating units of the formula

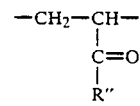

where R" represents the alkyl group. Preferably alkyl group R" will contain from 1 to 4 carbon atoms. It is even more advantageous when R" is methyl or ethyl, i.e., when the polymer is derived from methyl vinyl ketone or ethyl vinyl ketone. The alkyl vinyl ketones may be homopolymerized or copolymerized with one or more additional monomers. Ethylene and styrene are particularly useful comonomers for this purpose but other monomers such as propylene, butadiene, vinyl acetate, butyl acrylate, vinylidene chloride and the like may also be used.

Molecular weights of the ketone-containing polymers can range from about 1,000 up to several million or more. The polymers will typically have molecular weights from 1,000 to 2,000,000 and, more preferably from about 10,000 up to about 1,000,000. The carbonyl content, expressed in mole percent, will range from 0.01 up to about 25. More usually the carbonyl content ranges from 0.5 mole percent up to about 10 mole percent.

Ketonic polymers used for the process can be obtained by any of the known procedures described in the art for polymerizing α,β-unsaturated ketones. The method of preparation of the polymer plays no role in the process of the invention so long as the product is substantially free of impurities, such as catalyst residues or the like, which might interfere with the oxidation reaction.

The process of the invention may be advantageously used to modify copolymers having carbonyl groups pendant to the polymer chain obtained by copolymerizing a ketone-containing monomer with one or more olefinically unsaturated monomers such as styrene; α-methylstyrene; α-olefins; acrylonitrile; acrylimide; vinyl chloride; vinylidene chloride; vinyl acetate; methyl vinyl ketone; vinylpyridine; acrylic acid and esters thereof; methacrylic acid and esters thereof; maleic anhydride and mono-and diesters thereof; and the like.

Physical characteristics of polymers obtained by the instant process are primarily a function of the composition of the starting polymer, its molecular weight and molecular weight distribution, and the degree of conversion of carbonyl groups to oxycarbonyl groups. Reaction conditions and amount of oxidizing agent are the principal factors which influence conversion.

The process of this invention is carried out in an inert liquid medium, that is, a material which is a liquid at the reaction temperature and which does not react with either the starting ketonic polymer or the modified polymer and which is not oxidized under the reaction conditions. Additionally, the liquid should be one which is capable of either dissolving or swelling the ketone polymer. While the boiling point of the liquid medium is not critical, it should not be so high as to make removal of the solvent difficult. The reaction can be run under reflux conditions or in a pressure vessel.

Useful mediums for the reaction include hydrocarbons, chlorinated hydrocarbons, nitrohydrocarbons, carboxylic acids and carboxylic acid esters. Hexane, heptane, octane, benzene, decalin, methylene chloride, chlorobenzene, dichlorobenzene, nitrobenzene and dimethylphthalate are illustrative of the compounds which can be used as the reaction medium for the process. Aliphatic ($C_{5-10}$) hydrocarbons, benzene, chlorinated $C_{1-3}$ aliphatic hydrocarbons, chlorobenzene and dichlorobenzene are particularly advantageous for the process.

The weight ratio of the liquid medium to ketone polymer can vary over broad limits but generally ranges from 1:1 to 100:1. More preferably the weight ratio of solvent to starting polymer ranges from about 5:1 to 50:1.

An oxidizing agent is necessarily utilized for the process and is dispersed or dissolved in the inert liquid medium and contacted with the ketone-containing polymer. The molar ratio of oxidizing agent to carbonyl group ranges from about 0.1:1 to 30:1 and, most preferably, from 2:1 to 15:1.

Organic peroxyacids are employed as the oxidizing agent for the present process. Useful organic peroxyacids for the invention contain from 2 up to about 30 carbon atoms and correspond to the formula

where R* is an aliphatic, cycloaliphatic or aromatic moiety which can be unsubstituted or substituted with one or more halo, nitro or carboxyl groups.

When R* is aliphatic, i.e. an alkyl group, it will generally contain from 1 to 19 carbon atoms. When R* is cycloaliphatic, i.e., a cycloalkyl group, it will generally contain from 5 to 19 carbon atoms. When R* is aromatic, i.e. an aryl group, it will generally contain from 6 to 19 carbon atoms. As previously indicated, any of said alkyl, cycloalkyl or aryl groups can contain halo-, nitro- or carboxyl-substituents. Chloro and fluoro groups are particularly advantageous halo substituents.

In a particularly useful embodiment, the organic peroxyacid oxidizing agent is a chloro-, fluoro- or carboxyl-substituted aromatic or aliphatic peroxyacid. Peroxybenzoic acid, m-chloroperoxybenzoic acid, peroxyacetic acid, trifluoroperoxyacetic acid, monoperoxyphthalic acid and monoperoxymaleic acid are representative of the oxidizing agents which can be used. m-Chloroperoxybenzoic acid and monoperoxymaleic acid have been found to be particularly advantageous. The peroxyacid can be used as such, or formed in situ, e.g. by the reaction of maleic anhydride with hydrogen peroxide.

The oxidation reaction can be conducted at temperatures from about $-20°$ C. up to about 150° C.; however, it is generally considered most advantageous to carry out the reaction at a temperature from about 20° C. to 100° C. While reaction time will vary depending on the reactants and liquid medium used and the reaction temperature, it can range from 30 minutes under optimal or near optimal conditions up to 24 hours or more where low reaction temperatures and/or low concentrations of reactants are used.

The reaction conditions and time of reaction are selected based on the degree of conversion of carbonyl to oxycarbonyl desired. As previously pointed out, all or substantially all of the available carbonyl groups of the vinyl ketone polymer can be converted to ester moieties, if desired. It is more customary, however, to react only a portion of the available carbonyl groups so that the resulting polymer will contain both oxycarbonyl and carbonyl moieties. In most instances the reaction is carried to no more than 60% conversion of the keto groups. This permits the use of reaction times and conditions which minimize chain scission reactions.

The modified polymer products prepared in accordance with the invention, are recovered utilizing conventional procedures known to the art. Generally, the polymer solution or polymer dispersion is cooled to ambient conditions to precipitate the polymer which is then recovered by filtration. To facilitate this precipitation, precipitating diluents which are non-solvents for the polymers, i.e. do not dissolve or swell the polymer, can be added. Such precipitating diluents include but are not limited to methanol, ethanol, propanol, t-butanol, acetone and the like. Since excess oxidizing agent and by-products formed as a result of the reaction, e.g. carboxylic acids, may be precipitated with the modified polymer it is often advantageous to re-dissolve the polymer in a solvent, such as toluene or xylene, and re-precipitate by the addition of one or more of the aforementioned precipitating diluents. The recovered polymer is then dried and, if desired, additives incorporated therein.

It is known that polymers of the type employed for the process of this invention containing ketonic moieties, such as vinyl ketone polymers, exhibit photodegradability due to absorption of radiation by the carbonyl chromophore. Thus, if only a portion of the carbonyl functionality in these polymers is converted to oxycarbonyl groups, the resulting polymer will remain susceptible to photodegradation. The degree of photodegradability of the modified polymers will depend on the carbonyl content of the starting polymer and the percent conversion of carbonyl to oxycarbonyl groups.

Such conversions may alter the physical properties of the polymer and may impart some degree of crosslinkability to the resulting polymers. Furthermore, the introduction of ester groups may enhance the degradability of the resins since ester moieties are susceptible to hydrolytic cleavage and may support fungal growth.

Modified polymers obtained in accordance with the present process are useful as plastics and waxes. They are also useful as adhesives and coatings.

The following examples illustrate the invention more fully; however, they are not intended as a limitation on the scope thereof. In the examples all parts, percentages and ratios are on a weight basis unless otherwise indicated.

EXAMPLE I

Thirty-six grams styrene, 2.0 grams methyl vinyl ketone, 0.021 grams benzoyl peroxide and 40 mls ethyl acetate were charged to a reactor and stirred at 60° C. under nitrogen. After 48 hours the reaction mixture was concentrated under vacuum and 1.6 grams brownish oil recovered. Analysis confirmed the oily product to be a low molecular weight copolymer of styrene and methyl vinyl ketone. Infrared analysis showed a strong absorption at 1719 cm$^{-1}$ attributable to the presence of ketone carbonyl.

One gram of the styrene/methyl vinyl ketone copolymer (containing 8.3 mole % carbonyl) was dissolved in 15 mls chlorobenzene with 0.6 gram m-chloroperoxybenzoic acid and the mixture stirred for 9 hours at 90° C. The cooled reaction mixture was then diluted with 100 mls ethyl acetate and washed with 10% aqueous sodium sulfite, 5% aqueous sodium bicarbonate solution, and water. After drying over sodium sulfate the solution was filtered and concentrated to recover a brown viscous oil. Infrared analysis of the oily product showed an ester carbonyl absorption at 1731 cm$^{-1}$. Both product the infrared and nuclear magnetic resonance spectra confirmed essentially complete conversion of carbonyl to oxycarbonyl.

EXAMPLE II

To a flask were charged 36.0 grams styrene, 2.0 grams ethyl vinyl ketone, 0.023 grams benzoyl peroxide and 40 mls ethyl acetate. The mixture was stirred at 60° C. under nitrogen for 24 hours and then cooled and the polymer precipitated by addition of 800 mls methanol. The polymer was recovered by filtration, dissolved in toluene and reprecipitated using methanol. Yield of the dried styrene/ethyl vinyl ketone polymer was 11.0 grams. The infrared spectrum of the product showed a strong ketone carbonyl absorption at 1712 cm$^{-1}$. Analysis also indicated that the polymer contained 0.5 mole % carbonyl.

Two grams of the styrene/ethyl vinyl ketone copolymer was dissolved in 30 mls chlorobenzene at 80° C. and 1.6 grams m-chloroperoxybenzoic acid added thereto. The reaction mixture was stirred for 3 hours at 80° C., cooled to room temperature and the polymer precipitated by the addition of 100 mls methanol. The polymer product was recovered by filtration, dissolved in toluene and reprecipitated using methanol. Infrared analysis of the dried polymer product showed a significant decrease in the ketone carbonyl absorption compared to the starting copolymer and the presence of a strong absorption at 1737 cm$^{-1}$ attributable to the presence of ester carbonyl. Based on the relative areas under the absorption peaks conversion of carbonyl to oxycarbonyl was calculated to be 60%

To demonstrate the adhesive ability of the modified polymer containing both pendant keto and ester groups, one square inch of the polymer was sandwiched between two 1"×4" pieces of Kraft paper and melt bonded. A shear force of 500 grams was then applied to the melted bonded specimen while the temperature was increased from 50° C. in 5° C. increments every 15 minutes until shear adhesion failure occurred. Separation of the Kraft substrates adhered with the styrene/ethyl vinyl ketone copolymer modified in accordance with this invention did not occur until 119° C.

EXAMPLE III

An ethylene-vinyl ketone copolymer was dissolved in chlorobenzene at 80° C. The solution contained 0.75 gram copolymer in 40 mls of the solvent. m-Chloroperoxybenzoic acid (1.4 grams) was then charged to the flask and the reaction mixture stirred at 80° C. After 2 hours the mixture was cooled to room temperature and 150 mls methanol added to precipitate the polymer. The modified polymer product was collected on a filter and reprecipitated from toluene using methanol. The infrared spectrum of the dried product indicated 70% conversion of the available carbonyl functionality to ester groups.

We claim:

1. A process for oxidizing ketonic polymers derived from α,β-unsaturated ketones to convert carbonyl groups pendant to the polymer chain to oxycarbonyl groups comprising contacting an α, β-unsaturated ketone homopolymer or copolymer having a molecular weight greater than 1,000 and containing 0.01 to 25 mole percent carbonyl with an organic peroxyacid oxidizing agent having from 2 to 30 carbon atoms in an inert liquid medium at a temperature from −20° C. to 150° C.; the molar ratio of said oxidizing agent to carbonyl ranging from 0.1:1 to 30:1 and the weight ratio of said inert liquid medium to said ketonic polymer ranging from 1:1 to 100:1.

2. The process of claim 1 wherein substantially all of the carbonyl groups of the ketonic polymer are converted to oxycarbonyl groups.

3. The process of claim 1 wherein only a portion of the carbonyl groups of the ketonic polymer are converted to oxycarbonyl groups.

4. The process of claim 1 wherein the α, β-unsaturated ketone is an alkyl vinyl ketone wherein the alkyl group contains from 1 to 4 carbon atoms.

5. The process of claim 4 wherein the ketonic polymer has a molecular weight from 1,000 to 2,000,000 and contains −0.5 to 10 mole percent carbonyl.

6. The process of claim 5 wherein the organic peroxyacid oxidizing agent corresponds to the formula

in R* is an alkyl group having from 1 to 19 carbon where atoms; a cycloalkyl group having from 5 to 19 carbon atoms; an aryl group having from 6 to 19 carbon atoms; a halo-, nitro-, or carboxyl-substituted alkyl group having from 1 to 19 carbon atoms; a halo-, nitro- or carboxyl-substituted cycloalkyl group having from 5 to 19 carbon atoms; or a halo-, nitro-, or carboxyl-substituted aryl group having from 6 to 19 carbon atoms and the inert liquid medium is selected from the group consisting of hydrocarbons, chlorinated hydrocarbons, nitrohydrocarbons, carboxylic acids and esters of carboxylic acids.

7. The process of claim 6 wherein the ketonic polymer is a homopolymer of methyl vinyl ketone or ethyl vinyl ketone or a copolymer of methyl vinyl ketone or ethyl vinyl ketone with ethylene or styrene.

8. The process of claim 7 wherein the reaction is carried out at a temperature from 20° C. to 100° C., the organic peroxyacid oxidizing agent is a chloro-, fluoro- or carboxyl-substituted aromatic or aliphatic peroxyacid, the molar ratio of the organic peroxyacid to carbonyl ranges from 2:1 to 15:1 and the weight ratio of inert liquid medium to polyketone is from 5:1 to 50:1.

9. The process of claim 8 wherein the organic peroxyacid is formed in situ.

10. The process of claim 8 wherein the organic peroxyacid oxidizing agent is m-chloroperoxybenzoic acid.

11. The process of claim 8 wherein the organic peroxyacid oxidizing agent is peroxymaleic acid.

12. The process of claim 8 wherein the inert liquid medium is an aliphatic $C_{5-10}$ hydrocarbon, a chlorinated $C_{1-3}$ aliphatic hydrocarbon, benzene, chlorobenzene or dichlorobenzene.

* * * * *

UNITED STATES PATENT AND TRADEMARK OFFICE
CERTIFICATE OF CORRECTION

PATENT NO. : 5,064,912
DATED : November 12, 1991
INVENTOR(S) : Biau-Hung, Chang, Jack Kwiatek It is certified that error appears in the above-identified patent and that said Letters Patent is hereby corrected as shown below:

Abstract, line 4, "oxodizing" should read --oxidizing--; and
line 8, "α, β" should read --α,β--.

Column 1, line 33, "arc" should read --are--.

Column 3, line 20, delete "to".

Column 4, line 3, "α,θ" should read --α,β--; and
line 48, "acrylimide" should read --acrylamide--.

Column 7, line 14, delete "product"; and
line 51, "melted" should read --melt--.

Column 8, line 23, "α, β" should read --α,β--; and
line 28, "-0.5" should read --0.5--.

Signed and Sealed this

Sixth Day of July, 1993

Attest:

MICHAEL K. KIRK

Attesting Officer        Acting Commissioner of Patents and Trademarks